W. A. DEVEY.
AUTOMATIC WEIGHING APPARATUS.
APPLICATION FILED AUG. 16, 1918.
1,345,838.
Patented July 6, 1920.
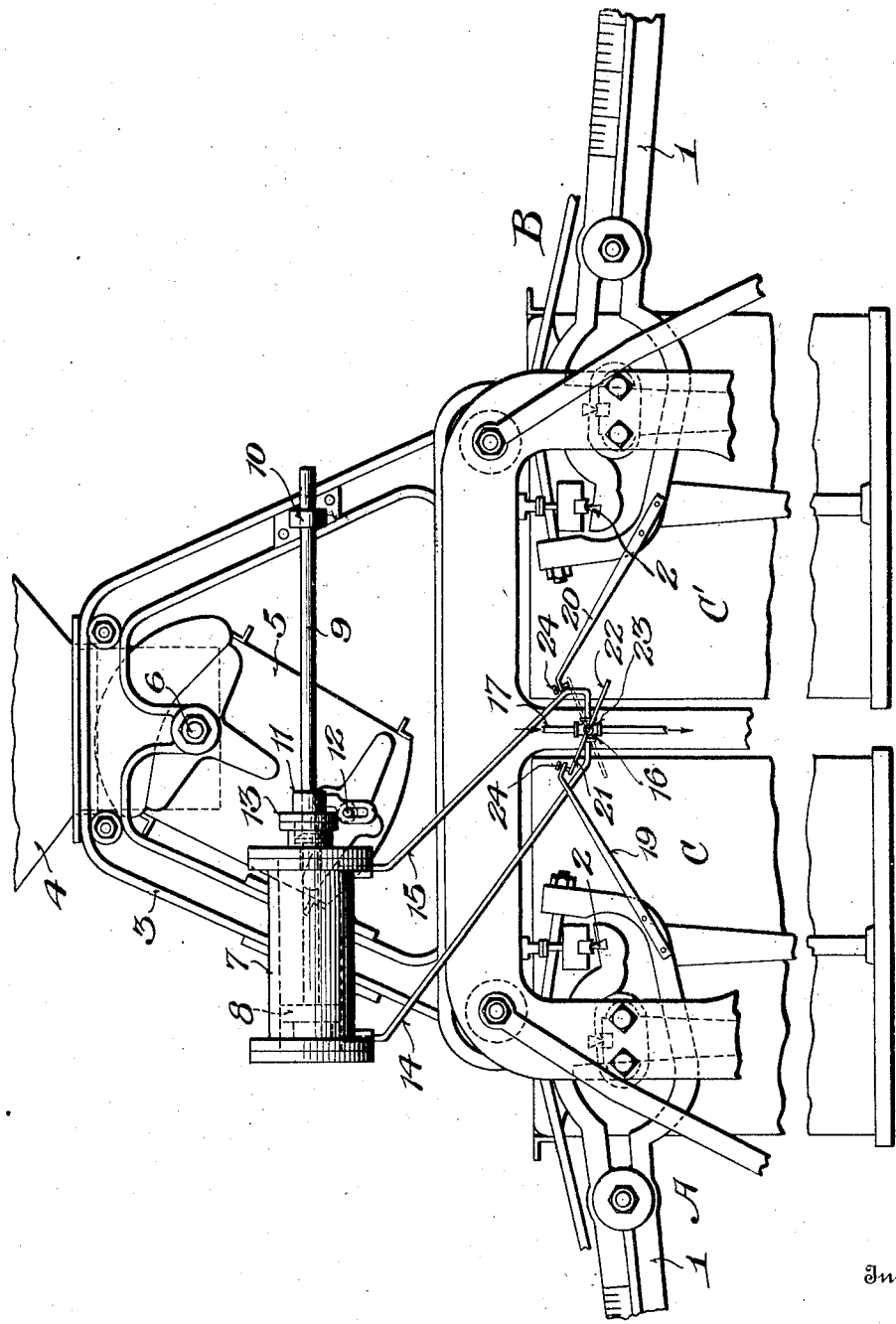
Inventor
Walter A. Devey.
By Church & Church
his Attorneys

UNITED STATES PATENT OFFICE.

WALTER A. DEVEY, OF AMERICAN FORK, UTAH.

AUTOMATIC WEIGHING APPARATUS.

1,345,838.      Specification of Letters Patent.      Patented July 6, 1920.

Application filed August 16, 1918. Serial No. 250,212.

*To all whom it may concern:*

Be it known that I, WALTER A. DEVEY, a citizen of the United States, residing at American Fork, in the county of Utah and State of Utah, have invented certain new and useful Improvements in Automatic Weighing Apparatus; and I do hereby declare the following to be a full, clear, and exact description of the same, reference being had to the accompanying drawings, forming part of this specification.

The present invention relates to weighing apparatus for weighing out uniform quantities of materials and more particularly to that class of devices which employ a plurality of scales and a pivoted chute for conveying the material, to be weighed, from a source of supply to suitable receptacles positioned on the scales, the primary object being to provide simple but positive means for moving the chute and holding the same in proper position to deliver the material to one receptacle when material of a predetermined weight has been delivered to the other receptacle.

With the above and other objects in view, the invention consists in certain constructions, arrangements and combinations of parts hereinafter described in the preferred form and particularly pointed out in the claims at the end of the specification.

Referring to the accompanying drawing wherein is illustrated the preferred form of the invention, the conventionally illustrated portion of the apparatus embodies two scales A and B, preferably of the platform type, each comprising the usual scale beam 1 pivoted on the knife edges 2.

Located above the frame work 3 of the scales is a hopper 4 from which the material to be weighed is fed by a chute 5 to receptacles C, C' positioned on the platforms of the scales. The discharge opening of the hopper 4 is located centrally above the two receptacles C, C' and the end of the chute adjacent the discharge opening of the hopper is pivotally secured on the frame work at 6 to permit the discharge end of the chute to be moved toward either side of the frame 3 into position to discharge the material alternately into the receptacles.

When the machine is in use the chute 5 is maintained in position over one of the receptacles until a predetermined quantity of material, according to weight, has been delivered to that receptacle, whereupon the delivery end of the chute is moved automatically over the other receptacle where it will remain until the desired quantity of material has been delivered to the second receptacle, when the operation is repeated. In the present invention this result is accomplished by the following construction.

Mounted on the frame work 3 by any suitable securing means is a cylinder 7 within which is a piston 8 adapted to be reciprocated by motive fluid, such as steam, supplied to the cylinder in a manner to be presently described. The piston rod 9 projects from the end of the cylinder adjacent the discharge chute 5 and extends across the frame 3, its outer end being slidably mounted in a guide member 10 secured in the frame. Secured on the piston rod 9 is a collar 11 to which delivery end of chute 5 is connected by a pin and slot connection 12, the collar 11 being so positioned on the piston rod that when it is moved against packing gland 13 the delivery end of the chute will be immediately over one of the receptacles and when the piston rod 9 is moved outwardly the chute will be brought over the other receptacle.

Communicating with the interior of cylinder 7 at opposite ends thereof are motive fluid supply pipes 14 and 15 which lead to a four way valve 16 which controls the communication between the main inlet and exhaust pipes 17 and 18 and the pipes 14 and 15. Valve 16 is preferably actuated by trip levers 19 and 20 which are mounted on the end of the respective scale beams 1 adjacent said valve in position to engage arms 21, 22 on the valve stem 23, each of said trip levers being provided with adjusting screws 24 for regulating the precise moment at which the valve 16 is to be actuated.

Assuming the various parts of the apparatus to be in the positions shown, when the required amount of material has been delivered to receptacle C, one end of the scale beam 1 of the scale on which that receptacle is positioned, will move upwardly, due to the balancing of the weight, and the other end of the beam carrying the trip lever 19 will move downwardly, the lever 19 engaging and depressing arm 21 of the valve stem 23 and actuating the valve to open communication between inlet passage 18 and supply pipe 14 and also between exhaust passage 17 and pipe 15. The steam admitted to the cylinder through pipe 14 will move piston 8 to the opposite end of the cylinder, this movement of the piston, and the piston rod, moving the discharge end of the chute to a position immediately above the receptacle C' on the other scale. As the valve remains in the same position the uninterrupted supply of steam will exert a constant pressure on the piston which will positively hold the discharge end of the chute over the receptacle C' until this receptacle is filled, at which time the valve 16 will again be actuated in the manner just described to return the chute to its initial position. It will be understood that the receptacle which was first filled will be removed and emptied while the second is being filled to permit the scale beam to assume a position where the trip lever will not interfere with the movements of the arms 21, 22 during the operations which will be repeated each time a receptacle is filled.

What is claimed is:

1. The combination with a plurality of independent weighing scales and a source of supply from which materials to be weighed are adapted to be fed to receptacles respectively on said scales, of a movable member for terminating the flow of material to either of said receptacles, fluid actuated means for moving said member, a valve controlling said fluid actuated means, and means operable by the scales to actuate said valve when material of a predetermined weight has been delivered to one of the receptacles.

2. The combination with a plurality of independent weighing scales of a source of supply of material to be weighed, a chute adapted to convey said material from the source of supply to receptacles on said scales, fluid actuated means connected to the chute for moving the delivery end of the latter from one receptacle to the other, a valve controlling said fluid actuated means, and means connected to the respective scales adapted to actuate said valve when material of a predetermined weight has been delivered to one of the receptacles, whereby the chute is moved and material is delivered to the other receptacle.

3. In a weighing apparatus, the combination with a plurality of independent scales, each embodying a fulcrumed scale beam, of a hopper located above said scales, a chute adapted to deliver material to be weighed from said hopper to receptacles on the scales, fluid actuated means for moving the delivery end of the chute from one receptacle to the other, a valve controlling said fluid actuated means, and valve operating members carried by the scale-beams for actuating said valve when material of a predetermined weight is delivered to one of the receptacles, whereby the delivery end of the chute is moved to the other receptacle.

4. In a weighing apparatus, the combination with a plurality of independent scales, of a hopper, a chute adapted to deliver material to be weighed from the hopper to receptacles on said scales, a cylinder, a piston working in said cylinder, connections between the piston and chute for moving the delivery end of the latter from one receptacle to the other, a valve controlling the movement of the piston in said cylinder, and means for actuating said valve when material of a predetermined weight is delivered to one of the receptacles, whereby the delivery end of the chute is moved to the other receptacle.

5. In a weighing apparatus, the combination with a plurality of independent scales, each embodying a fulcrumed scale beam, of a hopper located above said scales, a chute adapted to deliver materials to be weighed from the hopper to receptacles on said scales, a cylinder, a piston working in said cylinder, connections between said piston and the delivery end of said chute, whereby the delivery end of the chute is moved from one receptacle to the other by the piston, a valve controlling the movement of the piston in said cylinder, and valve operating members carried by the scale beams for actuating said valve when material of a predetermined weight is delivered to one of the receptacles, whereby the delivery end of the chute is moved to the other receptacle.

6. In a weighing apparatus, the combination with a plurality of scales, each embodying a fulcrumed scale beam, of a hopper located above the scales, a chute adapted to deliver materials to be weighed from the hopper alternately to receptacles on said scales, a cylinder, a piston working in said cylinder, connections between said piston and the delivery end of said chute, whereby the delivery end of the chute is moved from one receptacle to the other by the piston, a valve controlling the movement of the piston in said cylinder, oppositely disposed arms on said valve stem, means carried by the scale beams for engaging said arms and actuating said valve when material of a predetermined weight has been delivered to one of the receptacles, whereby the delivery end of the chute is moved to the other receptacle, and adjusting means for regulating the extent of movement of the scales before operation of said valve.

WALTER A. DEVEY.